US011522884B1

(12) United States Patent
Vashisht et al.

(10) Patent No.: US 11,522,884 B1
(45) Date of Patent: Dec. 6, 2022

(54) SUBSCRIPTION AND KEY MANAGEMENT SYSTEM

(71) Applicant: FireEye, Inc., Milpitas, CA (US)

(72) Inventors: Sai Vashisht, Morgan Hill, CA (US); Sumer Deshpande, San Jose, CA (US)

(73) Assignee: FireEye Security Holdings US LLC, Milpitas, CA (US)

( * ) Notice: Subject to any disclaimer, the term of this patent is extended or adjusted under 35 U.S.C. 154(b) by 198 days.

(21) Appl. No.: 17/133,411

(22) Filed: Dec. 23, 2020

Related U.S. Application Data

(60) Provisional application No. 62/953,424, filed on Dec. 24, 2019.

(51) Int. Cl.
*H04L 9/40* (2022.01)
*H04L 12/14* (2006.01)

(52) U.S. Cl.
CPC ...... *H04L 63/1416* (2013.01); *H04L 12/1403* (2013.01); *H04L 63/0442* (2013.01); *H04L 63/1433* (2013.01); *H04L 63/20* (2013.01)

(58) Field of Classification Search
CPC ............. H04L 63/1416; H04L 63/1433; H04L 63/0442; H04L 63/20
USPC ........................................................ 726/22
See application file for complete search history.

(56) References Cited

U.S. PATENT DOCUMENTS

| | | | |
|---|---|---|---|
| 6,898,632 B2 | 5/2005 | Gordy et al. | |
| 6,941,348 B2 | 9/2005 | Petry et al. | |
| 7,080,407 B1 | 7/2006 | Zhao et al. | |
| 7,080,408 B1 | 7/2006 | Pak et al. | |
| 7,243,371 B1 | 7/2007 | Kasper et al. | |
| 7,308,716 B2 | 12/2007 | Danford et al. | |
| 7,448,084 B1 | 11/2008 | Apap et al. | |
| 7,458,098 B2 | 11/2008 | Judge et al. | |
| 7,467,408 B1 | 12/2008 | O'Toole, Jr. | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Teshome Hailu
(74) *Attorney, Agent, or Firm* — Rutan & Tucker

(57) ABSTRACT

One embodiment of the described invention is directed to a key management module deployed within a cybersecurity system that operates as a multi-tenant Security-as-a-Service (SaaS) by relying on Infrastructure-as-a-Service (IaaS) cloud processing resources and cloud storage resources. The key management module is configured to assign a master key to a subscriber upon registration and, as requested, generate one or more virtual keys, based at least in part on the master key, for distribution to the subscriber. Each virtual key is included as part of a submission into the cybersecurity system and is used to authenticate the subscriber of the submission and verify that the subscriber is authorized to perform one or more tasks associated with the submission before the one or more tasks are performed.

20 Claims, 7 Drawing Sheets

(56) References Cited

U.S. PATENT DOCUMENTS

| | | |
|---|---|---|
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,674 B1 * | 4/2014 | Geide .................. G06F 21/552 726/25 |
| 8,713,681 B2 | 4/2014 | Silberman et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B2 | 8/2017 | Watters et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |

(56) References Cited

U.S. PATENT DOCUMENTS

| | | |
|---|---|---|
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 | 10/2019 | Desphande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |
| 10,929,266 B1 | 2/2021 | Goradia et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |

(56) References Cited

U.S. PATENT DOCUMENTS

| | | |
|---|---|---|
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0298203 A1* | 11/2013 | Ansari .................. H04L 69/24 726/4 |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0241580 A1 | 8/2016 | Watters et al. |
| 2016/0241581 A1 | 8/2016 | Watters et al. |
| 2016/0261612 A1 | 9/2016 | Mesdaq et al. |
| 2016/0285914 A1 | 9/2016 | Singh et al. |
| 2016/0301703 A1 | 10/2016 | Aziz |

(56) References Cited

U.S. PATENT DOCUMENTS

| | | | |
|---|---|---|---|
| 2016/0323295 A1 | 11/2016 | Joram et al. | |
| 2016/0335110 A1 | 11/2016 | Paithane et al. | |
| 2017/0083703 A1 | 3/2017 | Abbasi et al. | |
| 2018/0013770 A1 | 1/2018 | Ismael | |
| 2018/0048660 A1 | 2/2018 | Paithane et al. | |
| 2018/0069891 A1 | 3/2018 | Watters et al. | |
| 2018/0121316 A1 | 5/2018 | Ismael et al. | |
| 2018/0288077 A1 | 10/2018 | Siddiqui et al. | |
| 2019/0065278 A1* | 2/2019 | Jeuk | G06F 9/5077 |
| 2019/0087301 A1* | 3/2019 | M | H04L 67/131 |
| 2019/0104154 A1 | 4/2019 | Kumar et al. | |
| 2019/0132334 A1 | 5/2019 | Johns et al. | |
| 2019/0190942 A1* | 6/2019 | Drummond | H04L 43/16 |
| 2019/0207966 A1 | 7/2019 | Vashisht et al. | |
| 2019/0207967 A1 | 7/2019 | Vashisht et al. | |
| 2020/0252428 A1 | 8/2020 | Gardezi et al. | |
| 2020/0358780 A1* | 11/2020 | Anbalagan | H04L 63/105 |

FOREIGN PATENT DOCUMENTS

| | | | |
|---|---|---|---|
| WO | 0206928 A2 | 1/2002 | |
| WO | 02/23805 A2 | 3/2002 | |
| WO | 2007117636 A2 | 10/2007 | |
| WO | 2008/041950 A2 | 4/2008 | |
| WO | 2011/084431 A2 | 7/2011 | |
| WO | 2011/112348 A1 | 9/2011 | |
| WO | 2012/075336 A1 | 6/2012 | |
| WO | 2012/145066 A1 | 10/2012 | |
| WO | 2013/067505 A1 | 5/2013 | |

OTHER PUBLICATIONS

"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10 1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al., Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.

(56) References Cited

OTHER PUBLICATIONS

Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

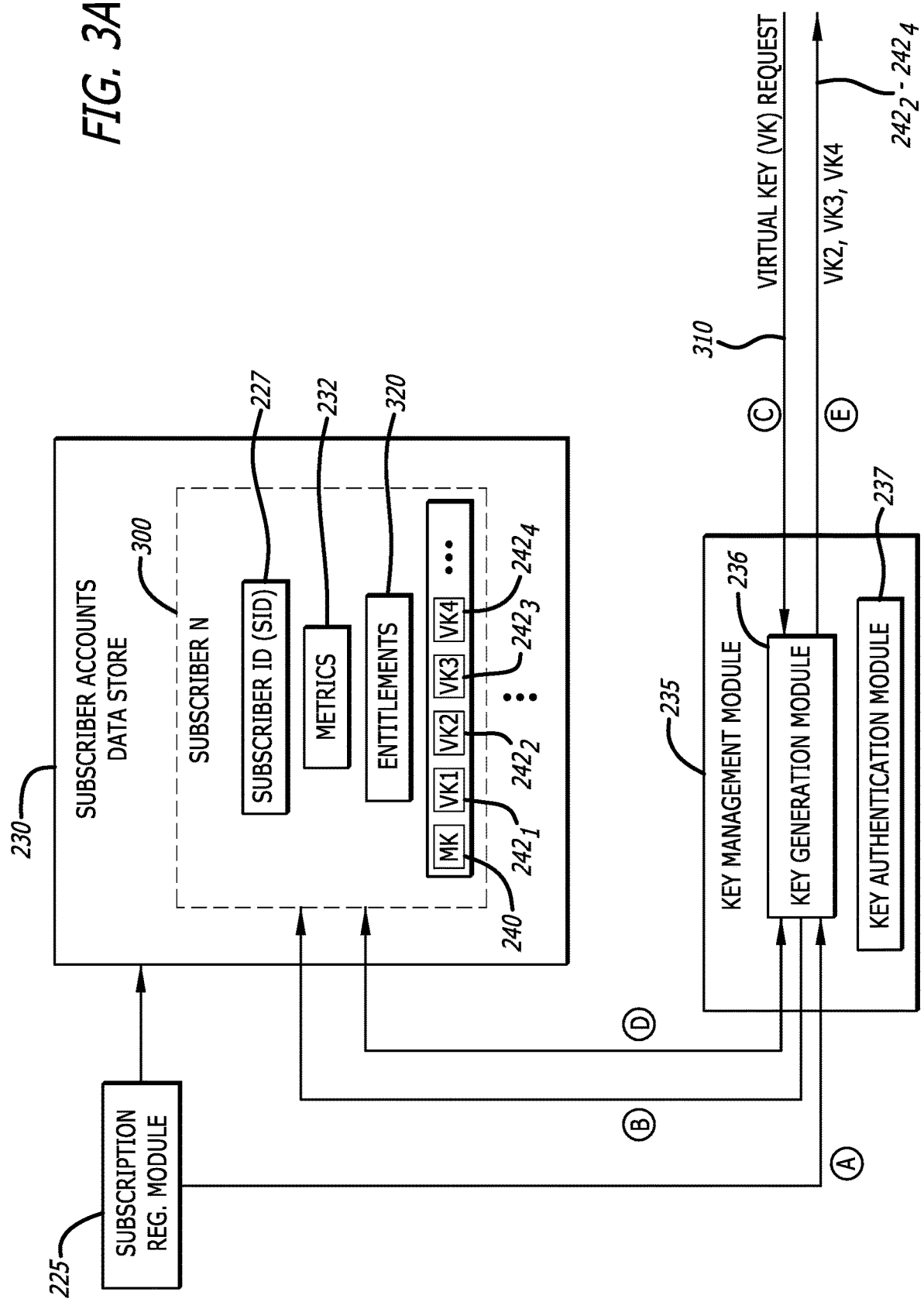

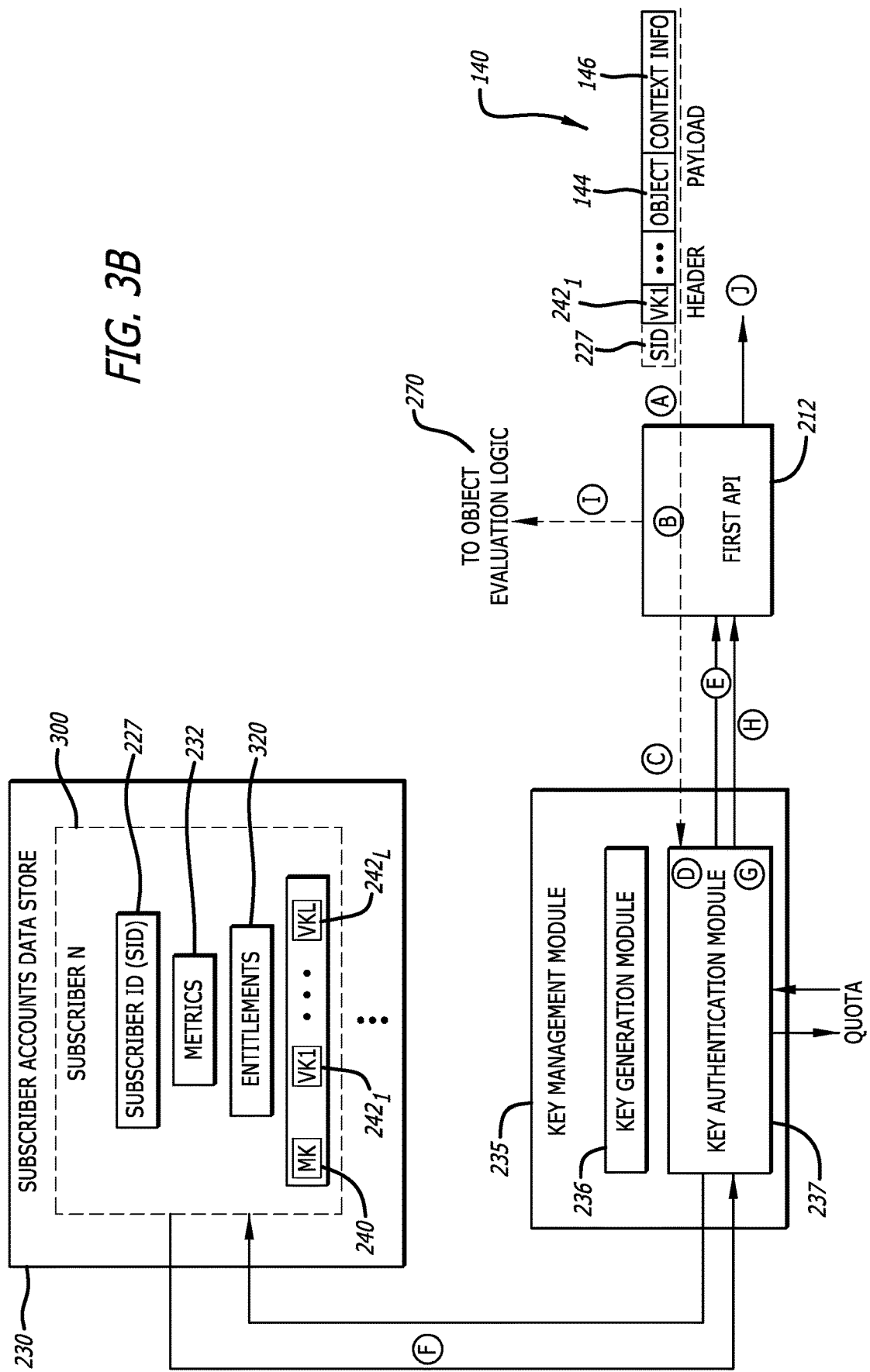

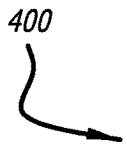
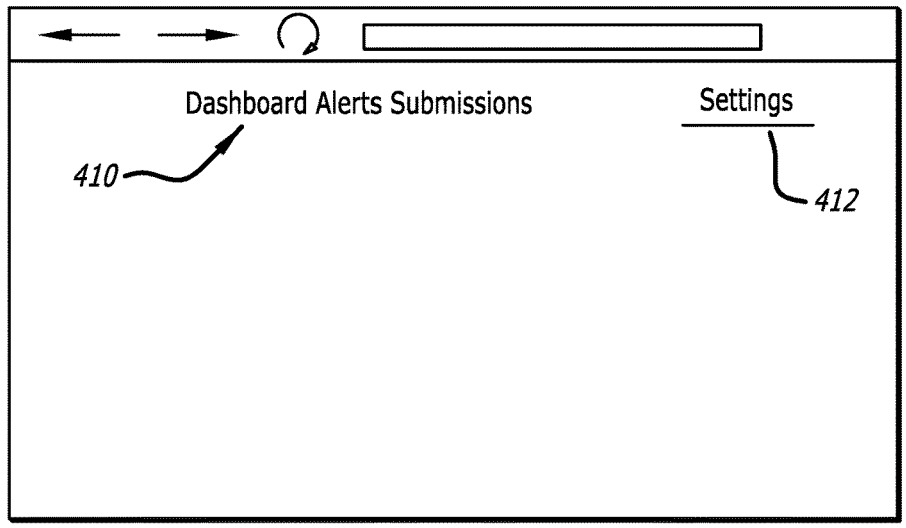
FIG. 4A
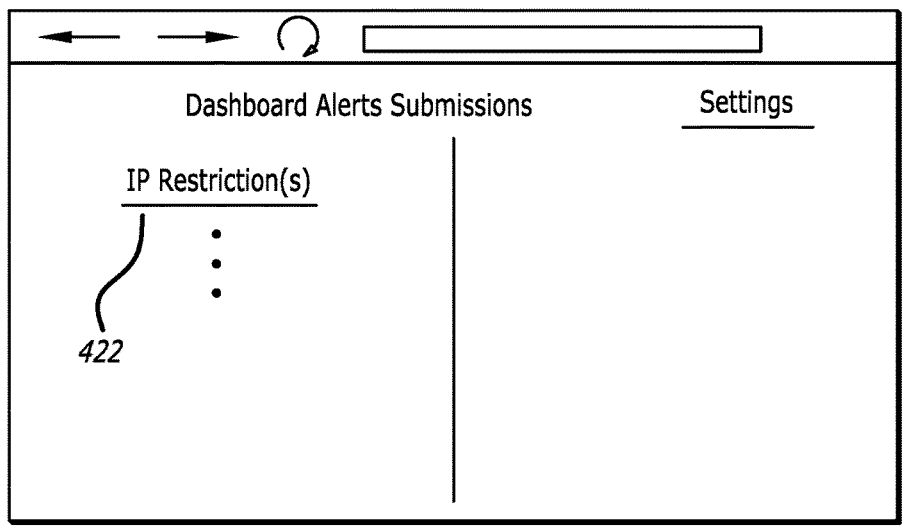
FIG. 4B
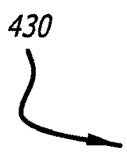
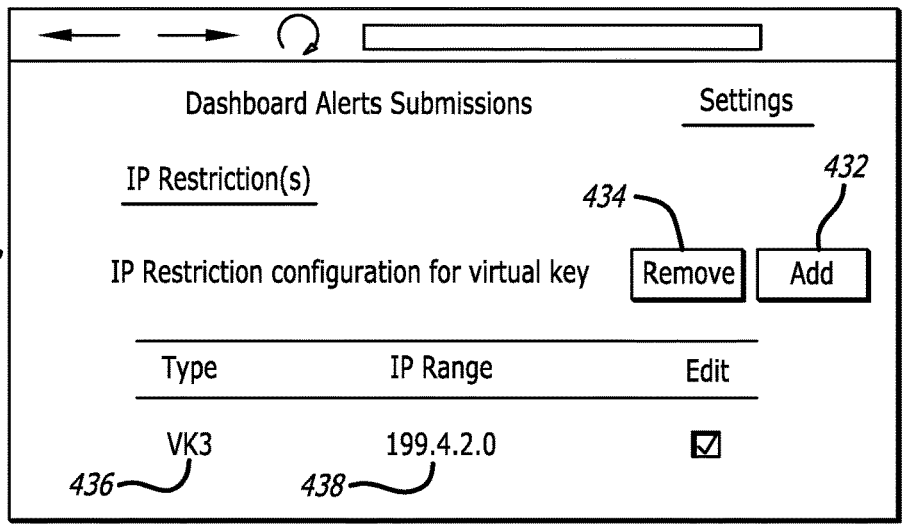
FIG. 4C

SUBSCRIPTION AND KEY MANAGEMENT SYSTEM

CROSS-REFERENCE TO RELATED APPLICATIONS

This application claims the benefit of priority on U.S. Provisional Application No. 62/953,424 filed on Dec. 24, 2019, the entire content of which are incorporated by reference herein.

FIELD

Embodiments of the disclosure relate to the field of cybersecurity. More specifically, one embodiment of the disclosure relates to a key management system for use in authenticating subscribers to multi-tenant, cloud-based cybersecurity services.

GENERAL BACKGROUND

In the past, businesses have relied on application software installed on one or more electronic devices residing in close proximity to its user (hereinafter, "on-premises electronic devices"). Each on-premises electronic device may constitute a type of computer such as a personal computer, a locally maintained mainframe, or a local server for example. As on-premises electronic devices became subjected to cybersecurity attacks (cyberattacks) more regularly, in order to protect these electronic devices, certain preeminent cybersecurity vendors began to develop and deploy on-premises threat detection appliances.

For on-premises deployments, a customer has to purchase threat detection appliances from a cybersecurity vendor, which requires both a significant upfront capital outlay for the purchase of the appliances as well as significant ongoing operational costs. These operational costs may include the costs for deploying, managing, maintaining, upgrading, repairing and replacing these appliances. For instance, a customer may be required to install multiple types of threat detection appliances within the enterprise network in order to detect different types of cybersecurity threats (cyberthreats). These cyberthreats may coincide with discrete activities associated with known or highly suspected cyberattacks.

As an illustrative example, a cybersecurity vendor would need to install one type of on-premises threat detection appliance that is directed to analyze electronic mail (email) messages for malware, normally ingress email messages from an outside source. Similarly, the cybersecurity vendor would need to install another type of on-premises threat detection appliance to analyze web-based content (e.g., downloaded web pages and related network traffic) in effort to detect cyberthreats such as web pages embedded with malware. Herein, "malware" may be generally considered to be software (e.g., executable) that is coded to cause a recipient electronic device to perform unauthorized, unexpected, anomalous, and/or unwanted behaviors or operations (hereinafter, "malicious behaviors"), such as altering the functionality of an electronic device upon execution of the malware.

Cybersecurity vendors have provided threat detection through cloud-based offerings that are self-hosted by these vendors. Herein, the responsibility for the above-described upfront capital outlays and ongoing operational costs is shifted from the customer to the cybersecurity vendor. As a result, the cybersecurity vendor are now saddled with even greater overall costs than a customer itself because the cybersecurity vendor must deploy infrastructure resources sized to handle the maximum aggregate threat detection analytic workload for all of its customers. These overall costs, directed to data processing and storage usage, would need to be passed on to its customers, where any significant cost increases may translate into a significant price increases for the cybersecurity services. As a result, customers are unable to accurately estimate or anticipate the costs associated with current and future cybersecurity needs, given that impact that changes in cybersecurity need, amongst all of the customers, may influence the costs apportioned for processing or storage usage.

Recently, more businesses and individuals have begun to rely on a public cloud network (hereinafter, "public cloud") for all types of services, including cybersecurity services offered by the cloud provider. A "public cloud" is a fully virtualized environment with a multi-tenant architecture that enables tenants (i.e., customers) to establish different cloud accounts, but share computing and storage resources and retain the isolation of data within each customer's cloud account. The virtualized environment includes on-demand, cloud computing platforms that are provided by a collection of physical data centers, where each data center includes numerous servers hosted by the cloud provider. Examples of different types of public clouds may include, but is not limited or restricted to Amazon Web Services®, Microsoft® Azure® or Google Cloud Platform™ for example.

This growing reliance on public cloud platforms is due, in large part, to a number of advantages offered by these platforms, where these advantages may be realized by cybersecurity providers as well. However, deployment of a cybersecurity system as a Security-as-a-Service (SaaS) within a public cloud operating as an Infrastructure-as-a-Service (IaaS) poses a number of challenging, given the high number of submissions of data for analysis that may reach into the millions for a subscriber to that cybersecurity system (SaaS-subscriber). Each submission would need to be tracked back to the subscriber for verification and confirmation of compliance with the terms of the subscription, where the keying mechanism offered by public clouds is not equip to monitor submissions associated with different SaaS-subscribers of the cybersecurity system.

BRIEF DESCRIPTION OF THE DRAWINGS

Embodiments of the invention are illustrated by way of example and not by way of limitation in the figures of the accompanying drawings, in which like references indicate similar elements and in which:

FIG. 3A is a block diagram of an exemplary embodiment of the operability of the key generation module being part of the key management module deployed within the administrative control logic of FIG. 2.

FIG. 3B is a block diagram of an exemplary embodiment of the operability of the key authentication module being part of the key management module deployed within the administrative control logic of FIG. 2.

FIG. 4A is a block diagram of an exemplary embodiment of a first display screen window of a series of display screen windows for altering settings associated the cloud-based cybersecurity system.

FIG. 4B is a block diagram of an exemplary embodiment of a second display screen window of the series of display screen windows providing a link for setting IP address restrictions on a virtual key.

FIG. 4C is a block diagram of an exemplary embodiment of a third display screen window of the series of display screen windows for adding and/or removing an address restrictions to virtual keys.

DETAILED DESCRIPTION

Figure 1A:
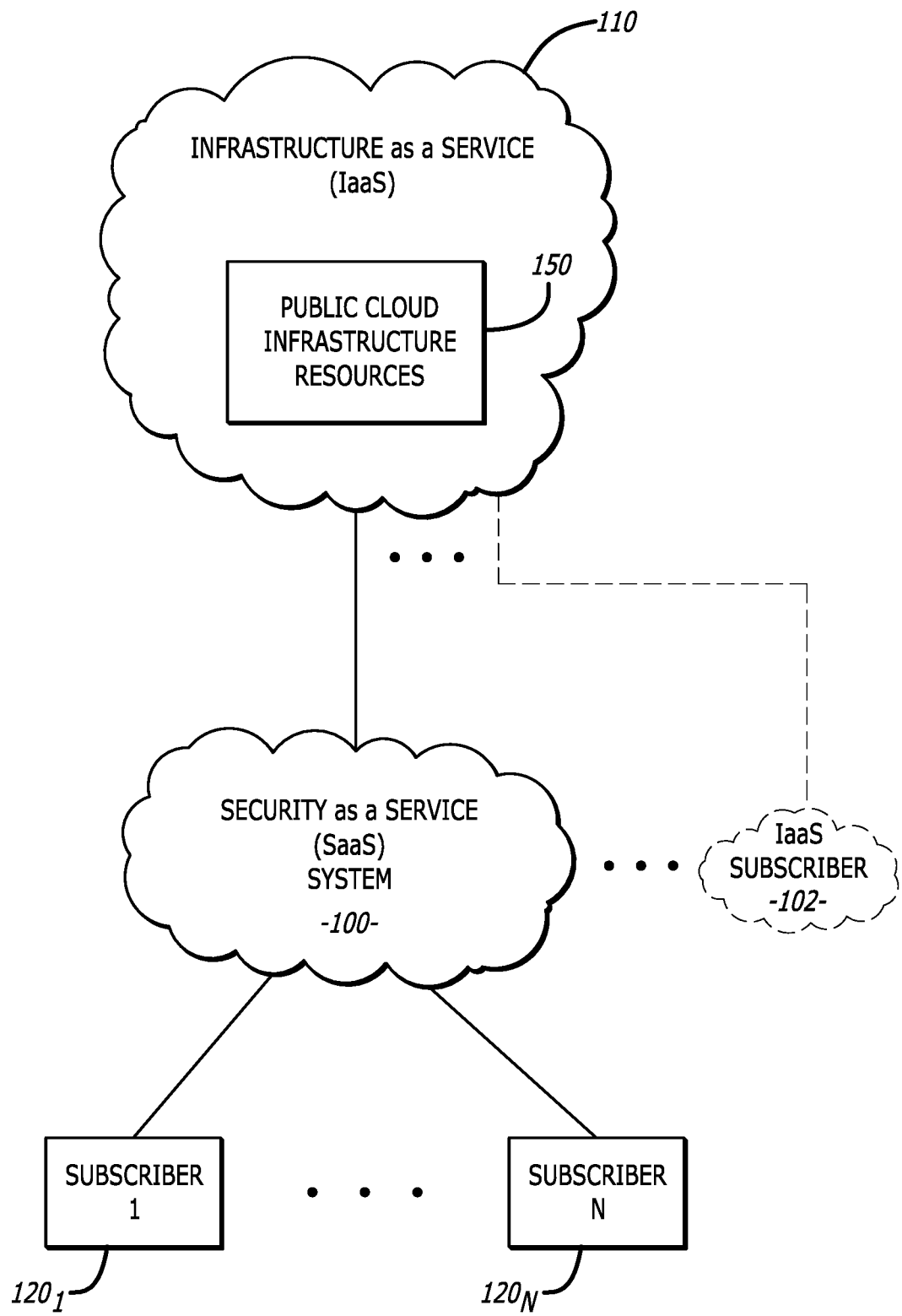
FIG. 1A is a block diagram of an exemplary embodiment of a cloud-based cybersecurity system deployed as a Security-as-a Service (SaaS) layered on a public cloud operating as an Infrastructure-as-a-Service (IaaS).

Embodiments of the present disclosure generally relate to a cloud-based cybersecurity system leveraging resources associated with the infrastructure provided by a public cloud. One embodiment of the cybersecurity system operates as a multi-tenant (subscription-based) Security-as-a-Service (SaaS), which is layered on a multi-tenant Infrastructure-as-a-Service (IaaS) cloud platform. As a result, multiple subscribers may be afforded access to cybersecurity services offered by the cybersecurity system while multiple users, including the cybersecurity system, may be afforded access to shared resources hosted by the public cloud (hereinafter, "public cloud infrastructure resources"). Stated differently, as the SaaS-operating cybersecurity system (hereinafter, "cybersecurity system" or "SaaS") may be installed by a cybersecurity vendor being a different entity than the cloud provider, the SaaS may deploy a vendor-specific proprietary software stack to run on the compute and storage resources provided by the IaaS cloud platform.

According to this illustrative embodiment, the SaaS-oriented cybersecurity system deploys a key management system that is responsible for generating keys (described below as "virtual keys"), which are distributed to a subscriber of the cybersecurity system (e.g., administrator) for subsequent distribution to different subscriber members. The different subscriber members may be different persons (e.g., analysts, other administrators, etc.) or different entities within an enterprise (e.g., groups, business units, departments, subsidiaries or agencies, etc.). The virtual keys enable the cybersecurity system and/or the subscriber itself to monitor a number or rate of submissions at a selected granularity (e.g., by person or by entity) in order to track usage of the cybersecurity system by those subscriber members. Such data may enable a subscriber to identify certain subscriber members within an enterprise who may be violating internal submission procedures and/or abusing submission privileges. Additionally, the virtual keys may enable a security administrator to pinpoint a particular person, group, department, agency or subsidiary within an enterprise (e.g., multi-national company, government, etc.) that may be experiencing a cybersecurity attack based on a higher than normal level of submissions or the results of the submissions.

As an additional feature, an administrator may access a dashboard to select a particular virtual key and restrict usage of the key to a particular address. For example, a virtual key may be restricted to usage by a specific source Internet Protocol (IP) address or a range of source IP addresses. This allows each of the virtual key to be restricted, if desired, to a particular network device associated with the source IP address or a collection of network devices represented by a range of IP addresses to allow the virtual key to be used by a group of subscribers. Herein, according to one embodiment, a virtual key may be restricted to a specific public IP address or range of public IP addresses. This restriction may be performed by the administrator at any time while the virtual key is active (e.g., when awarded to a subscriber with restriction to the subscriber's IP address, when the virtual key is compromised to restrict usage to only the subscriber's IP address range allocated to an enterprise associated with the virtual key, etc.).

In light of this dual, multi-tenant deployment, the cybersecurity system may be configured to charge usage in accordance with a different pricing scheme than offered by the IaaS (public cloud). For example, the cybersecurity system may be configured with a tiered subscription pricing scheme based on a number of submissions of objects undergoing cyberthreat analytics by the cybersecurity system (e.g., the number of objects uploaded via a portal or other type of interface or the number of objects processed to account for objects created and processed during processing of another object if more details analytics are requested along with additional subscription enrichments (e.g., enhanced reporting formats, memory dump capabilities, etc.). Additionally, or in the alternative, the cybersecurity system may be configured with a "pay per usage" pricing scheme, which enjoys no maximum submission thresholds over a prescribed duration but higher costs are applied to each submission.

As a result of the SaaS deployment described herein, the cybersecurity system enables both the customer and cybersecurity vendor to avoid the complexity and significant capital outlay in buying and operating physical servers and other datacenter infrastructure. Instead, the cybersecurity vendor incurs the costs associated with the actual use of certain public cloud infrastructure resources, such as storage amounts or compute time as measured by the time of data processing conducted by computing instances hosted by the public cloud and configured as analytic engines within the cybersecurity system as described below. The subscribers incur the costs associated with their actual number of object submissions for a determination as to whether the objects constitute a cyberthreat.

Unlike conventional cyberthreat detection appliances, the cybersecurity system is configured to be "submission agnostic," meaning that the same submission scheme may be followed for uploading different object types for analysis (e.g., email messages, web page content, uniform resource locators (URLs), hashes, files, documents, etc.) and/or the same multi-stage evaluation is conducted on a data sample, inclusive of that object and context information associated with the object, independent of object type. Herein, the architecture of the cybersecurity system is designed to conduct cyberthreat analytics on multiple types of objects uploaded to cybersecurity system by at least (i) validating a submission by confirming that requisite information is included within the submission, (ii) authenticating the subscriber that input the submission based on operations of a key management system integrated as part of the cybersecurity system, and/or (iii) verifying the subscriber is authorized to perform the task(s) associated with the submission. Upon successful validation, authentication and/or verification of a particular type of submission, such as a submission for example, the cybersecurity system conducts cyberthreat analytics on the object in accordance with a multi-stage evaluation that is submission agnostic (i.e., evaluation stages do not change based on the object type).

The cybersecurity system is configured to conduct cyberthreat analytics on data samples submitted from a subscriber in efforts to determine whether any objects, included as part of the data samples, are associated with a cyberattack (i.e., constitute a cyberthreat). Each data sample includes an object and context information associated with that object. The data sample is encapsulated as part of a submission, which includes a key assigned by the cybersecurity system for subscriber authentication and determination of subscription entitlements associated with the subscriber, as described below.

Unlike conventional cyberthreat detection appliances, the cybersecurity system handles the submission and analytics for multiple, different object types (e.g., email messages, web page content, uniform resource locators (URLs), hashes, files, documents, etc.). Stated differently, the cybersecurity system is designed to analyze multiple types of objects through a cybersecurity service that (i) validates a submission including the object submitted for cyberthreat analytics, (ii) authenticates the subscriber submitting the data sample based on operations of a key management system integrated as part of the cybersecurity system, and upon successful validation and authentication, (iii) conducts cybersecurity analytics on the object in accordance with a multi-stage evaluation that is object type agnostic (i.e., evaluation stages do not change based on the object type).

I. General Summary

A. Overview

In general, the cybersecurity system may be configured to receive multiple types of objects included as part of a submission through an interface (e.g., a cybersecurity portal, device interface including one or more Application Programming Interfaces "APIs", etc.) upon completion of a subscriber onboarding process. Upon receipt of an object included as part of a data sample, the cybersecurity system may validate the submission by confirming that the submission includes requisite information such as credential(s), a subscription identifier (hereinafter, "Subscription ID"), or the like. Additionally, the cybersecurity system may authenticate the subscriber by confirming that the submitted credential is active and verify that the subscriber is authorized to perform the requested task(s) through analysis of entitlements made available to the subscriber based on its chosen subscription type as identified by the Subscription ID (e.g., subscription parameters such as access privileges, submission thresholds, virtual key allocation threshold, etc.).

Based on submission validation, subscriber authentication, and task verification, the cybersecurity system may conduct cyberthreat analytics on the object, namely analyses conducted on the object and/or context information associated with the object. The context information may include meta-information associated with the object (object context), meta-information associated with the subscription (entitlement context), and/or meta-information associated with the submission (submission context). As illustrative examples, as described below, the "submission context" may include meta-information pertaining to the submission, such as the time of input, origin of the object included in the submission (e.g., from email, network cloud shared drive, network transmission medium, etc.), location of the subscriber's network device providing the object, or the like.

The "entitlement context" may include meta-information pertaining to the subscription selected by subscriber, such as information directed to what features are permitted by the subscription (e.g., types of analytics supported, reporting formats available, or other features may distinguish different subscription tiers). Lastly, the "object context" may include meta-information pertaining to the object, such as its extension type.

Herein, according to one embodiment of the disclosure, the analytic engines may be selected based, at least in part, on the submission context, entitlement context and/or the object context. As a result, the analytic engines may be selected as a combination of any single type or any combination of two or more types of the following analytic engines: (i) static analytic engines that conduct an analysis on the content of an object and generate results including observed features represented by characteristics of the object (and accompanying context information); (ii) dynamic analytic engines that conduct an execution of the object and generate results including features represented by observed behaviors of the analytic engine (and accompanying context information); (iii) machine learning analytic engines that conduct extraction of insights using a trained module and generate results including features represented by a probability of an object being malicious (and accompanying context information); and/or (iv) emulation analytic engines that conduct reproduction of operations representing the execution of the object without such execution and generate results including features represented by the emulated behaviors (and accompanying context information).

Thereafter, the generated results (features) produced by the cyberthreat analytics conducted on the object (and its context information) are correlated with features of known malicious objects and/or known benign objects to determine a threat verdict for the object (e.g., malicious/benign, good/bad. high-risk/low-risk or any other measurement to signify the likelihood of the object being malicious or non-malicious). Based on the assigned threat verdict, the cybersecurity system may be further configured to conduct post-processing analytics based, at least in part, on the correlated results in order to determine what additional operations, if any, are to be conducted on the object. These operations may include retention of a portion of the context information associated with an identified malicious or benign object within the cybersecurity intelligence used by the cybersecurity system, transmission of the object to a forensic team for subsequent analysis, or the like.

In addition to conducting cyberthreat analytics, the cybersecurity system is configured to monitor and maintain, on a per subscriber basis, SaaS metrics. The SaaS metrics may include, inter alia, a sum total of submissions made by a subscriber to the cybersecurity system (SaaS subscriber) during a selected time period and/or a sum total of active virtual keys currently issued to the SaaS subscriber. The SaaS metrics may be used for billing of the subscriber based on the number of submissions made during a selected time period, and in some cases, to ensure compliance with subscription entitlements.

B. General Architecture

Herein, the cybersecurity system includes an architecture that relies upon the public cloud infrastructure resources and monitors the usage of various services (e.g., submissions, virtual key issuances, etc.) to ensure compliance with subscription entitlements as well as for reporting and billing purposes. According to one embodiment of the disclosure, the cybersecurity system operates as a multi-tenant, subscription-based SaaS), which leverages resources, such as compute and storage resources, hosted by an IaaS cloud platform, although other deployments are available and pertain to the broader spirit and scope of the invention. The cybersecurity system features (i) interface logic, (ii) administrative control logic, (iii) multi-stage, object evaluation logic, and/or (iv) reporting logic.

The interface logic enables communications to the administrative control logic to validate a submission, authenticate a subscriber associated with the submission, and verify that that the subscriber is authorized to perform one or more tasks associated with the submission. Depending on the submission type, upon submission validation, subscriber authentication and task verification, the interface logic enables the return of data requested by the submission to the subscriber or routes at least a portion of the submission to the object evaluation logic. For example, as an illustrative embodiment, the interface logic may include a cybersecurity portal that allows any user (potential subscriber) to register and establish a subscription with the cybersecurity system. After the subscription is established, the user (referred to as the "subscriber") may receive credentials to allow for the submission of objects (in the form of data samples including the object and its context information) via a cybersecurity portal for cyberthreat analytics, submission of queries for certain subscriber-based metrics, or submission of parameters for customizing functionality of the object evaluation logic akin to the subscriber's needs.

Additionally, after the subscription is established, the interface logic may be provided with an additional interface (hereinafter, "device interface"). The device interface includes logic supporting one or more APIs, where access to the APIs may depend on the subscription entitlements. The APIs may include a first API that provides an interface for the submission of objects (and its context information) for cyberthreat analytics, a second API for subscription management (e.g., ascertain the subscriber-based metrics), and a third API for management and/or customization of the functionality of analytic engines operating within the object evaluation logic.

The administrative control logic includes a subscription management module, a subscriber accounts data store, a key management module, a consumption quota monitoring module, a configuration management module, and a subscription billing module. The subscriber accounts data store may be non-volatile, cloud-based storage hosted by the public cloud that is allocated to the IaaS subscriber (e.g., the cybersecurity vendor), where different portions of the subscriber accounts data store may be allocated to each SaaS subscriber. Therefore, each SaaS subscriber includes one or more virtual data stores that are secured and inaccessible by other SaaS subscribers. Other of the above-identified modules may be shared by the SaaS subscribers, where these modules are maintained with cloud-based storage hosted by the public cloud and operate based on execution of these modules by compute engines hosted by the public cloud.

The subscription management module is configured to control access to the cybersecurity system by controlling a subscriber onboarding process in which user information and financial information are acquired prior to selection, by the user, of a particular subscription tier. The subscription tiers may be allocated based on submission thresholds, over a prescribed period of time, a desired number of submission sources (e.g., number of persons (e.g., security analytics, functional organization, departments, subsidiaries) or network devices to be provided with a virtual key for subscriber authentication), or the like. Based on a chosen subscription tier, after successful completion, a subscription identifier (hereinafter, "Subscription ID") may be assigned to the subscription secured by the subscriber and stored within a particular portion of the subscriber accounts data store reserved for that subscriber.

According to one embodiment of the disclosure, the subscriber accounts data store may be configured as (i) one or more virtual data stores each maintaining a record of the account data for a particular subscriber, (ii) one or more virtual data stores maintaining a collection of references (e.g., links, etc.) each directed to a different portion of cloud-based storage maintained in the aggregate for the IaaS subscriber (cybersecurity vendor), but allocated separately by the cybersecurity system to different SaaS subscribers to include account data, or (iii) a combination thereof (e.g., storage of credentials and/or personal identifiable information within the virtual data store(s) along with references to a remainder of the account data maintained at different virtual data stores.

Herein, according to one embodiment of the disclosure, subscriber account data may include any information (or meta-information) that may be used to identify the subscriber, provide subscription status, authenticate a subscriber based on keys (e.g., access control data in the form of any credential such as a cryptographic key, a token, a hash value, or representatives thereof), identify certain entitlements provided to the submission provided by the subscriber. Also, the subscriber account data may be used to verify compliance with subscription entitlements prior to the cybersecurity system completing a task requested by the submission, or the like. According to one embodiment of the disclosure, the subscriber account data may include a Subscription ID and information associated with the subscriber (e.g., contact information, financial information, location, etc.); subscription entitlements (e.g., subscription parameters such as submission threshold, virtual key allocation threshold, accessible API(s), rate caps (number of submissions per a prescribed unit of time), additional enrichments based on the particular subscription for the subscriber, which may include additional analytic capabilities made available to submissions from the subscriber, additional reporting formats available to the subscriber, etc.). Additionally, the subscriber account data may further maintain metrics pertaining to the subscription (e.g., SaaS metrics and/or IaaS metrics, etc.).

Within an embodiment of the administrative control logic, the key management module is deployed to control credential generation and subscriber authentication. In particular, upon establishing a subscription, the key management module is notified by the subscription management module to generate a first credential (referred to as a "master key") assigned to a subscriber associated with the subscription. The master key may be maintained, in the SaaS, as part of the subscriber account data, but it is not freely accessible to the subscriber. Instead, the master key may operate as a basis (e.g., seed keying material) used by the key management module to generate a set of second credentials (each credential referred to as a "virtual key").

In particular, according to one embodiment of the disclosure, each virtual key may be based, at least in part, on the contents of the master key. One or more virtual keys may be generated and returned to the subscriber in response to a key generation request submission, provided a sum total of the number of requested virtual keys and the number of active virtual keys do not exceed the subscription entitlements. Upon receipt of the one or more virtual keys, an administrator of the subscriber requesting the virtual keys may distribute them to other persons or entities for use and internal tracking of virtual key use, as described above.

A virtual key is included as part of a submission (e.g., submission, consumption quota submission, parameter adjustment, etc.) to authenticate the subscriber and verify that the subscriber is authorized to perform the task associated with that submission. The virtual keys allow for tracking of usage of the cybersecurity system by different subscriber members (e.g., individuals, groups, departments, subsidiaries, etc.) as well as administrative control over access to the cybersecurity system, given that the virtual keys may be disabled, assigned prescribed periods of activity, or the like. Also, usage of the virtual keys may be restricted to a particular address or range of addresses to further mitigate unauthorized use of a virtual key. For instance, as an illustrate embodiment, the virtual keys may be restricted to any selected range of source IP addresses, from a single source IP address to restrict usage to a particular network device of a subscriber or to a group (plurality) of source IP addresses that may be an uninterrupted sequence of IP addresses assigned to an enterprise (company), as shown in FIGS. 4A-4E.

For this embodiment of the administrative control logic, the consumption quota monitoring module may be accessed through the second API (or via the cybersecurity portal) to enable the subscriber to obtain metrics associated with the current state of the subscription (e.g., active status, number of submissions for a particular submission type (or in total) conducted during the subscription period, number of submissions remaining for the subscription period, etc.). Additionally, the consumption quota monitoring module may be accessed by the key management module in order to confirm an incoming submission does not exceed the submission threshold being part of the key allocation threshold being part of the submission. This reliance may occur if the key management module is permitted access to the credential information (e.g., master key, virtual keys, etc.) stored as part of the subscriber account data.

The configuration management module is configured to enable a subscriber, via the third API (or cybersecurity portal), to specify parameters that control operability of the cyberthreat analytics. For instance, prior to controlling such operability, the key management module, upon receipt of a parameter adjustment submission, may extract a virtual key included as part of the submission to authenticate the subscriber and verify that the subscriber is authorized to perform this task (parameter adjustment to change operability of the object evaluation logic). Such authentication may be accomplished by comparing the virtual key to those active virtual keys for the subscriber stored as part of the subscriber account data.

The subscription billing module may be configured to maintain an account of the number of submissions (e.g., submissions) over a prescribed period of time and generate a request for payment from the SaaS subscriber accordingly. Additionally, the subscription billing module may be operable to identify other paid cloud-based services utilized by the SaaS-subscriber for inclusion as part of the payment request. According to one embodiment, the subscription billing module may access the subscriber account data for the requisite information. Additionally, the subscription billing module may be configured to confirm that the subscription parameters have not been exceeded (to denote additional billing) for a time-based, flat-fee subscription (e.g., yearly, monthly, weekly or daily).

According to this embodiment of the disclosure, the object evaluation logic may be separated into multiple evaluation stages. Herein, operating as part of the first evaluation stage, the preliminary analytic module may be configured to conduct one or more preliminary analyses on content within the data sample, which includes the object and/or the context information accompanying the object, in comparison with content associated with accessible cybersecurity intelligence. The cybersecurity intelligence may include context information associated with known malicious objects and known benign objects gathered from prior analytics conducted by the cybersecurity system as well as cybersecurity intelligence from sources external to the cybersecurity system.

Based on analysis of the context information, upon classifying the object as suspicious, the analytic engine selection module is provided access to the object and/or the context information as additional cyberthreat analytics are necessary. Otherwise, responsive to the preliminary analyses determining that the object is malicious or benign, the preliminary analytic module may bypass further cyberthreat analyses of the object.

Operating as part of the second evaluation stage, the analytic engine selection module is configured to determine one or more analytic engines to conduct cyberthreat analytics of the object, where this determination is based, at least in part, on the context information accompanying the object. The context information may be categorized as submission context, entitlement context, and/or object context as described below. The analytic engine selection module may select the type of analytic engines (e.g., static analytic engine(s), dynamic analytic engine(s), machine-learning engine(s), and/or emulation analytic engine(s)) based on the context information as a whole, namely a selection scheme based on an aggregate of context types.

Operating as part of the third evaluation stage, the cyberthreat analytic module includes one or more analytic engines that are directed to different analysis approaches in analyzing an object for malware (and whether it constitutes a cyberthreat). These analytic engines may include any one or combination of the following: (i) static analytic engines; (ii) dynamic analytic engines; (iii) machine learning analytic engines; and/or (iv) emulation analytic engines. During run-time, additional analytic engines may be needed to analyze objects that are recovered through the processing (e.g., execution) of another object (hereinafter, "sub-engines"). The first set of analytic engines may operate concurrently (e.g., at least partially overlapping in time), while the sub-engines may operate when its corresponding "parent" analytic engine completes its analysis.

As described herein, the static analytic engines conduct an analysis on the content of the object and generates results including observed features represented by characteristics of the object and context information associated with the object. The context information provides additional information associated with the features (e.g., specific characteristic deemed malicious, location of that characteristic within the object, or the like. The dynamic analytic engines conduct an execution of the object and generate results including features represented by observed behaviors of the analytic engine along with context information accompanying the observed features (e.g., software profile, process or thread being executed that generates the malicious features, source object type, etc.). Similarly, machine learning analytic engines submit the object as input into a trained machine-learning module that generates results including features represented by insights derived from the machine-learning module and accompanying context information. Lastly, emulation analytic engines conduct reproduction of operations representing the execution of the object, without such execution, which generates results including features represented by the emulated behaviors and its accompanying context information.

Operating as part of the fourth evaluation stage, a correlation module is configured to classify the object included as a part of the data sample as malicious, benign, unknown or suspicious based on the above-identified features collected from the analytic results produced by the analytic engines and their accompanying context information. This classification of the object (threat verdict) is provided to the post-processing module that is part of the fifth evaluation stage.

Depending on the threat verdict, the post-processing module may initiate actions to remediate a detected cyberthreat (object). Additionally, or in the alternative, the post-processing module may add certain context information associated with the object to the cybersecurity intelligence utilized by the preliminary analytic module in accordance with a prescribed retention policy maintained by the post-processing module.

The reporting logic is configured to generate a displayable report including the comprehensive results of the cyberthreat analytics (e.g., threat verdict, observed features and any corresponding meta-information representing the results associated with the cyberthreat analytics, context information associated with the observed features that identify the analyses conducted to produce the observed features, circumstances surrounding the features when observed, etc.). Accessible via the cybersecurity portal, the displayable report may be provided as an interactive screens or series of screens that allow a security administrator (corresponding to a representative of the SaaS-subscriber) to view results of submissions in the aggregate and "drill-down" as to specifics associated with one of the objects uploaded to the cybersecurity system within a submission. The reporting logic may rely on a virtual key or the Subscription ID, which may be part of the submission provided to the object evaluation logic, to identify the subscriber and determine a preferred method for conveyance of the alert (and set access controls to preclude access to contents of the alert by other SaaS-subscribers). Additionally, or in the alterative, the reporting logic may generate an alert based on the comprehensive results of the cyberthreat analytics. The alert may be in the form of a message (e.g., "threat warning" text or other electronic message).

II. Terminology

In the following description, certain terminology is used to describe aspects of the invention. In certain situations, the terms "logic," "module," and "engine" are representative of hardware, firmware, and/or software that is configured to perform one or more functions. As hardware, the logic (or module or engine) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or module or engine) may be software in the form of one or more software modules, which may be configured to operate as its counterpart circuitry. For instance, a software module may be a software instance that operates as a processor, namely a virtual processor whose underlying operations is based on a physical processor such as an EC2 instance within the Amazon® AWS infrastructure for example. Additionally, a software module may include an executable application, a daemon application, an application programming interface (API), a subroutine, a function, a procedure, an applet, a servlet, a routine, source code, a shared library/dynamic load library, or even one or more instructions.

The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or module or engine) may be stored in persistent storage.

The term "computerized" generally represents that any corresponding operations are conducted by hardware in combination with software and/or firmware.

The term "malware" is directed to software that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of a network device executing that software in a malicious manner; (2) alters the functionality of the network device executing that software without any malicious intent; and/or (3) provides an unwanted functionality which is generally acceptable in other context.

The term "network device" should be generally construed as physical or virtualized device with data processing capability and/or a capability of connecting to a network, such as a public cloud network (e.g., Amazon Web Service (AWS®), Microsoft Azure®, Google Cloud®, etc.), a private cloud network, or any other network type. The network devices may be used by or a security operations center (SOC), Security Information and Event Management system (SIEM), a network administrator, a forensic analyst, or cybersecurity system for another security provider for communication with an interface (e.g., cybersecurity portal) to access a SaaS-operating cybersecurity system. Examples of a network device may include, but are not limited or restricted to, the following: a server, a router or other intermediary communication device, an endpoint (e.g., a laptop, a smartphone, a tablet, a desktop computer, a netbook, etc.) or virtualized devices being software with the functionality of the network device. The network device may also be deployed as part any physical or virtualized device communicatively coupled via a device interface (e.g., API(s)) for gaining access to the SaaS-operating cybersecurity system.

The term "submission" a type of message (prescribed, structured data format) that is intended to result in a particular task to be performed. The tasks may include object-based analytics (submissions), return of requested information (consumption quota submissions), parameter updates that may influence operations associated with the cyberthreat analytics (parameter adjustment submissions), or the like. With respect to submissions, the submission may include a data sample, namely an organized collection of data including one or more objects and context information at least pertaining to the object(s). An "object" generally refers to a collection of information (e.g., file, document, URL, web content, email message, etc.) that may be extracted from the data sample for cyberthreat analytics.

As described herein, cybersecurity system may be deployed to operate as a subscription-based Security-as-a-Service (SaaS) that utilizes public cloud infrastructure resources, such as virtual computing, virtual data stores, and/or virtual (cloud) database resources for example, provided by an Infrastructure-as-a-Service (IaaS) cloud platform. The cybersecurity system may be configured to operate as a multi-tenant service; namely a service made available to tenants (also referred to as "subscribers") on demand. The IaaS cloud platform may be configured to operate as a multi-tenant service to which a cybersecurity vendor offering the cybersecurity system corresponds to an IaaS-subscriber. Therefore, the cybersecurity system may leverage resources offered by the IaaS cloud platform to support operations conducted by SaaS-subscribers.

The terms "benign," "suspicious" and "malicious" are used to identify different likelihoods of an object being associated with a cyberattack (i.e., constituting a cyberthreat). An object may be classified as "benign" upon determining that the likelihood of the object being associated with a cyberattack is zero or falls below a first threshold (i.e. falls within a first likelihood range). The object may be classified as "malicious" upon determining that the likelihood of the object being associated with a cyberattack is greater than a second threshold extending from a substantial likelihood to absolute certainty (i.e. falls within a third likelihood range). The object may be classified as "suspicious" upon determining that the likelihood of the object being associated with a cyberattack falls between the first threshold and the second threshold (i.e. falls within a second likelihood range). Different embodiments may use different measures of likelihood of malicious and non-maliciousness. Therefore, this terminology is merely used to identify different levels of maliciousness.

In certain instances, the terms "compare," "comparing," "comparison," or other tenses thereof generally mean determining if a match (e.g., identical or a prescribed level of correlation) is achieved between two items under analysis (e.g., context information, portions of objects, etc.) or representations of the two items (e.g., hash values, checksums, etc.).

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. Cybersecurity System Architecture

Referring to FIG. 1A, a block diagram of an exemplary embodiment of a cybersecurity system 100 operating as a service supported by resources hosted by a cloud platform 110 (e.g., infrastructure provided by Microsoft Azure®, Amazon Web Services®, or Google Cloud®) is shown, According to this embodiment, the cybersecurity system 100 operates as a multi-tenant, Security-as-a-Service (SaaS), which is accessible by a plurality of tenants $120_1$-$120_N$ (N≥1) on demand (hereinafter, "subscribers" $120_1$-$120_N$) over a transmission medium 130. Examples of subscribers $120_1$-$120_N$ may include enterprises (companies, partnerships, co-ops, etc.), individuals, or even other cybersecurity vendors that intend to utilize the cybersecurity system 100 to conduct additional analytics on objects submitted to the cybersecurity system 100 in order to obtain a threat verdict (e.g., malicious or non-malicious determination) for that object or verify a threat verdict ascertained by another cybersecurity vendor.

The SaaS-operating cybersecurity system 100 may operate in cooperation with the multi-tenant, cloud platform 110, which corresponds to an Infrastructure-as-a-Service (IaaS) cloud platform 110. Hence, multiple subscribers $120_1$-$120_N$ may be provided controlled access to cybersecurity services offered by the SaaS-operating cybersecurity system 100 while multiple users (subscribers to the IaaS 110), including the SaaS-operating cybersecurity system 100 and any other IaaS subscriber 102, may be provided controlled access to shared resources hosted by the IaaS cloud platform 110 (hereinafter, "public cloud infrastructure resources 150"). For example, the SaaS 100 may deploy a vendor-specific proprietary software stack to run on the resources 150 (e.g., compute and storage resources) provided by the IaaS cloud platform 110. According to this embodiment, the SaaS-operating cybersecurity system 100 is controlled by a different entity than the IaaS cloud provider.

Based on the dual multi-tenant deployment, the SaaS-operating cybersecurity system 100 may be configured to charge usage of the SaaS in accordance with a different parameters (and pricing scheme) than offered by the IaaS (public cloud). For example, the SaaS-operating cybersecurity system 100 may be configured with subscription tier pricing based on the number of submissions with objects provided to undergo cyberthreat analytics by the SaaS-operating cybersecurity system 100 (e.g., number of objects uploaded via a portal or other type of interface) or the number of objects processed (e.g., to account for objects included as part of one or more submissions and additional objects processed that were produced during the processing of another object).

This SaaS-IaaS deployment enables both the customer and cybersecurity vendor to avoid significant capital outlays in buying and operating physical servers and other datacenter infrastructure. Rather, the cybersecurity vendor incurs the costs associated with the actual use of certain public cloud infrastructure resources 150 in the aggregate, such as IaaS-based storage amounts or compute time for analytic engines formed from IaaS-based computing instances. The subscribers incur the costs associated with their actual number of submissions (e.g., submissions described below) input into the SaaS-operating cybersecurity system 100.

Figure 1B:
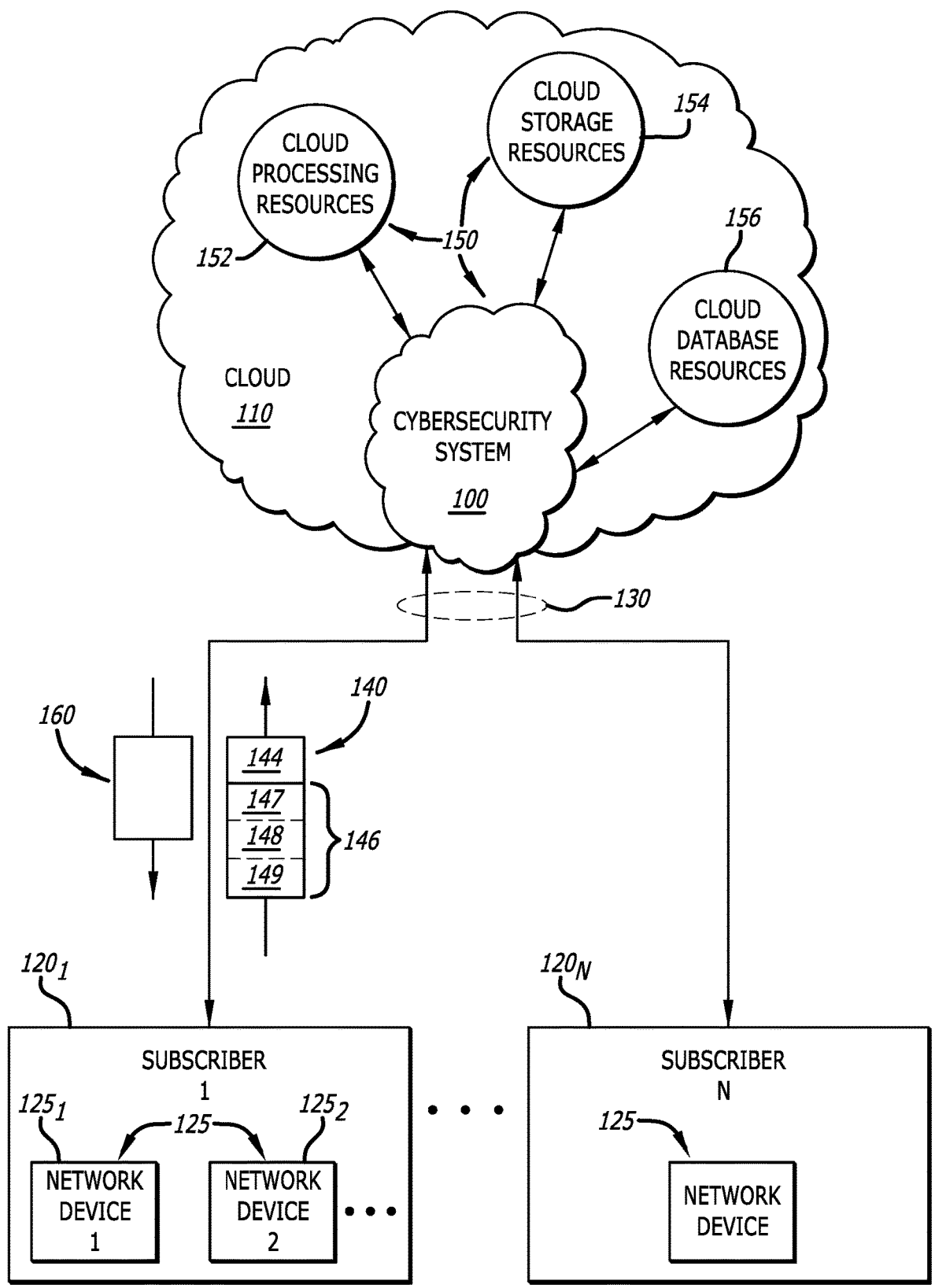
FIG. 1B is a block diagram of an exemplary embodiment of a cloud-based cybersecurity system deployed as a cybersecurity service within a cloud network.

Referring to FIG. 1B, a block diagram of an exemplary embodiment of the SaaS-operating cybersecurity system 100 leveraging the public cloud infrastructure resource 150 provided by the IaaS cloud platform (referred to as "public cloud") 110 is shown. For this embodiment, the cybersecurity system 100 is configured to operate as a multi-tenant, subscription-based SaaS; namely, a cloud-based subscription service that utilizes storage and compute services hosted by the public cloud 110 and is available to the plurality of subscribers $120_1$-$120_N$ over the transmission medium 130 including a public network (e.g., Internet).

As shown, according to one embodiment of the disclosure, each subscriber (e.g., subscriber $120_1$ . . . , or subscriber $120_N$ as shown) may include one or more subscriber members using network devices 125, where each of the subscriber members (network devices) 125 may be permitted access to the cybersecurity system 100 if credentials submitted by that subscriber member (network device) 125 are authenticated. According to one embodiment of the disclosure, the credential authentication may be conducted in accordance with a key authentication scheme in which a (virtual) key generated by the cybersecurity system 100 and provided to a subscriber (e.g., subscriber $120_N$), which may be distributed to a subscriber member, to gain access to the cybersecurity system 100. Herein, the network devices 125 may be used by different sources, including but not limited or restricted to a security operations center (SOC), a Security Information and Event Management system (STEM), a network administrator, a forensic analyst, a different cybersecurity vendor, or any other source seeking cybersecurity services offered by the cybersecurity system 100.

Herein, the cybersecurity system 100 is logic that leverages public cloud infrastructure resources 150. In particular, the logic associated with the cybersecurity system 100 may be stored within cloud-based storage resources (e.g., virtual data stores corresponding to a physical, non-transitory storage medium provided by the public cloud 110 such as Amazon® S3 storage instances, Amazon® Glacier or other AWS Storage Services). This stored logic is executed, at least in part, by cloud processing resources (e.g., one or more computing instances operating as virtual processors whose underlying operations are based on physical processors, such as EC2 instances within the Amazon® AWS infrastructure). As additional storage and/or processing capabilities are required, the cybersecurity system 100 may request and active additional cloud processing resources 152 and cloud storage resources 154.

According to this embodiment of the disclosure, the cybersecurity system 100 is configured to receive and respond to messages 140 requesting one or more tasks to be conducted by the cybersecurity system 100 (hereinafter referred to as "submissions"). One of these submissions 140 may include an object 144 along with context information 146. From the time of supplying to the cybersecurity system 100 to the time of routing to the object evaluation logic 270, the context information 146 pertaining to the object 144 may be included as part of the submission 140.

According to one embodiment of the disclosure, the context information 146 may include different context types such as context information 147 associated with the submission 140 (submission context 147), context information 148 associated with entitlements associated with a subscription to which the submitting source belongs (entitlement context 148), and/or context information 149 associated with the object 144 (object context 149). The context information 146 is not static for the object 144 at the time of submission. Rather, the context information 146 may be modified (augmented) based on operations within the cybersecurity system 100, especially entitlement context 148 obtained from a subscriber's account. Herein, the context information 146 may be used to identify the subscriber $120_1$ responsible for submitting the submission 140.

As described above, the cybersecurity system 100 may leverage the public cloud infrastructure resources 150 hosted by the public cloud 110. As described above, the public cloud infrastructure resources 150 may include, but are not limited or restricted to cloud processing resources 152 (e.g., computing instances, etc.) and cloud storage resources 154 (e.g., virtual data stores operating as non-volatile or volatile storage such as a log, queues, etc.), which may be allocated for use among the subscribers $120_1$-$120_N$. The public cloud infrastructure resources 150 may further include cloud (Amazon®) database resources 156 operating as the subscriber accounts data store (as described below). By leveraging the infrastructure of the public cloud 110, the cybersecurity system 100 is able to immediately "scale up" (add additional analytic engines, as permitted by the subscription) or "scale down" (terminate one or more analytic engines) its cloud resource usage when such usage exceeds or falls below certain monitored thresholds.

As an illustrative example, the cybersecurity system 100 may monitor capacity levels of virtual data stores operating as queues that provide temporary storage at certain stages during analytics of the object 144 (hereafter, "queue capacity"). The queue capacity may be determined through any number of metrics, such as the number of queued objects awaiting analytics, usage percentages of the queues, computed queue wait time per data sample, or the like. Hence, the cybersecurity system 100 may scale up its usage of any public cloud infrastructure resources 150, such as cloud processing resource 152 being customized to operate as analytic engines as described below, upon exceeding a first threshold, perhaps for a prolonged period of time to avoid throttling. Similarly, the cybersecurity system 100 may scale down its usage of the cloud processing resource 152 upon falling below a second threshold, perhaps for the prolonged period of time as well.

Also, the cybersecurity system 100 may utilize the public cloud infrastructure resources 150 for supporting administrative tasks. As an illustrative example, the cybersecurity system 100 may be allocated cloud storage resources 152 for maintaining data for use in monitoring compliance by the subscribers $120_1$-$120_N$ with their subscription entitlements. The subscription entitlements may be represented as permissions such as (i) a maximum number of submissions over a prescribed period of time (e.g., subscription time period, yearly, monthly, weekly, daily, during certain hours, etc.), (ii) a maximum number of active virtual keys providing authorized access to the cybersecurity system 100, (iii) additional capabilities as provided by enhancements made available based on the selected subscriber tier, or the like.

The cybersecurity system 100 supports bidirectional communications with the subscribers $120_1$-$120_N$ in which one or more responses 160 to the submissions 140 are returned to the subscribers $120_1$-$120_N$. For example, in response to the submission 140 provided from a network device 1251 of the first subscriber $120_1$, the response 160 may correspond to a displayable report 160 (e.g., provided by the cybersecurity portal 205) including comprehensive results of cyberthreat analytics conducted on the object 144 and its accompanying context information 146. Examples of the comprehensive results may include a threat verdict, observed features and any corresponding meta-information representing the results associated with the cyberthreat analytics, and context information associated with the observed features (e.g., information that identifies the analyses conducted to produce the observed features, circumstances the features occurred, etc.). Additionally, or in the alterative, the response 160 may include one or more alert messages (hereinafter, "alert message(s)"). The alert message(s) may include a portion of the comprehensive results of cyberthreat analytics, such as the threat verdict and name of the object 144.

Figure 2:
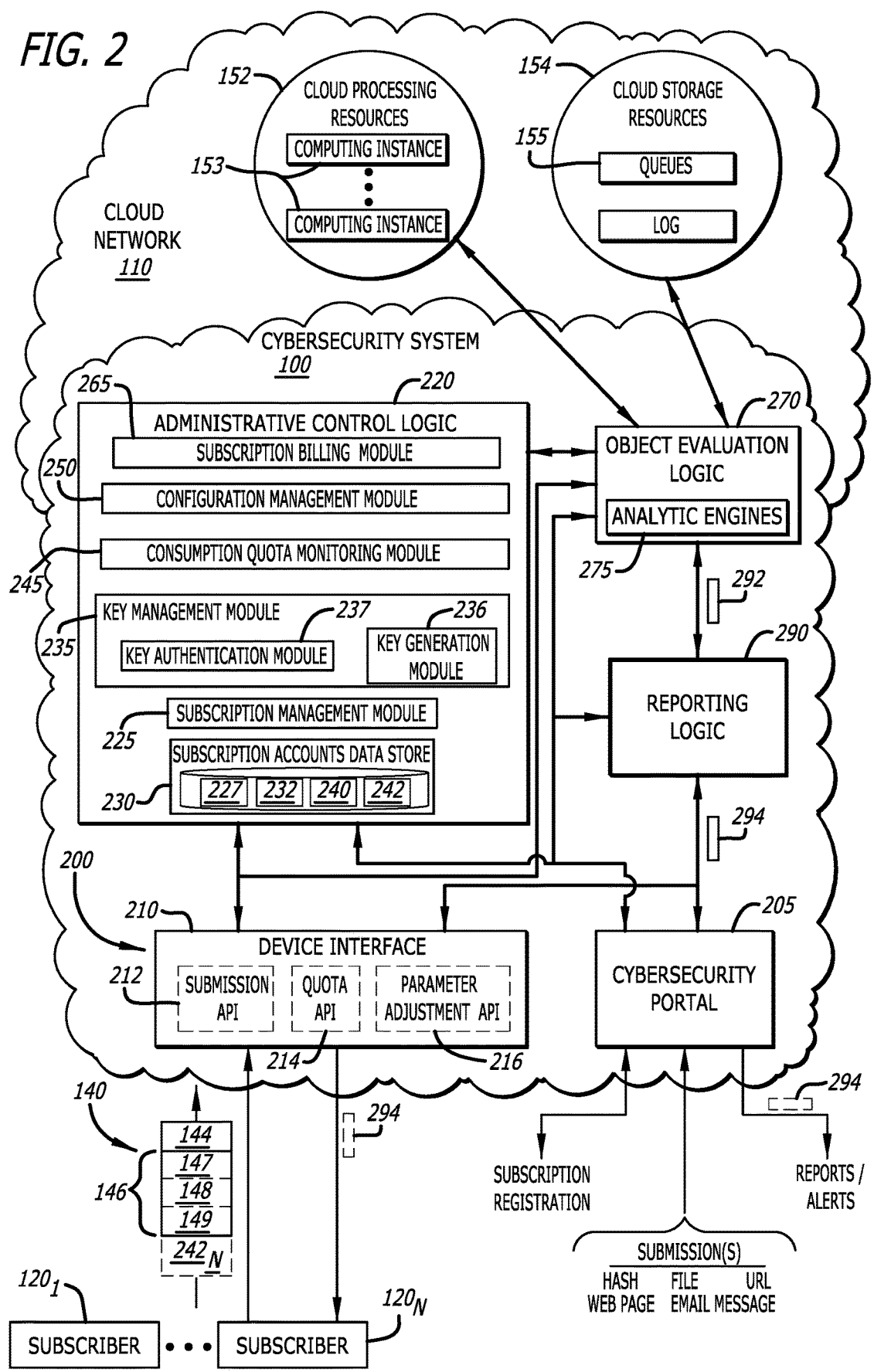
FIG. 2 is a block diagram of an exemplary embodiment of logic forming the cybersecurity system of FIGS. 1A-1B.

Referring now to FIG. 2, a block diagram of an exemplary embodiment of logic forming the cybersecurity system 100 of FIG. 1B is shown, wherein the logic relies upon the public cloud infrastructure resources 150 and monitors accesses to the cybersecurity system 100 for subscription compliance, billing and reporting. Herein, the cybersecurity system 100 features interface logic 200, administrative control logic 220, object evaluation logic 270, and reporting logic 290.

As shown, according to this embodiment of the disclosure, based on the type of submission 140 for example, the interface logic 200 enables communications with different modules forming the administrative control logic 220. Upon validation of the submission 140, authentication of a subscriber (e.g., subscriber $120_N$) providing the submission 140 and verification that the subscriber $120_N$ is authorized to perform the task or tasks associated with the submission 140, the task(s) associated with the submission 140 is(are) performed.

According to one embodiment of the disclosure, as shown in FIG. 2, the interface logic 200 includes a cybersecurity portal 205 that allows any user (potential subscriber) to register and establish a subscription with the cybersecurity system 100. After the subscription is established, the user (referred to as the "subscriber") may be provided with additional accessibility to the cybersecurity system 100 via a device interface 210 corresponding to logic supporting one or more APIs, where different combinations of APIs may be provided depending on the terms of the subscription. For example, in submission of an object, logic associated with an API of the device interface 210 may be configured to await for the validation of the submission 140, authentication of the subscriber $120_N$ submitting the data sample submission 140 and verification that the subscriber $120_N$ is authorized to submit content of the submission 140 for cyberthreat analytics before routing to the object evaluation logic 270. The device interface 210 supports automated network device 125 to cybersecurity system 100 communications as the cybersecurity portal 205 supports all submission types.

More specifically, according to one embodiment of the disclosure, as shown in FIG. 2, the device interface 210, when deployed, include a first API 212, a second API 214 and/or a third API 216. In particular, as an illustrative embodiment, the device interface 210 may include the first API 212 that provides an interface for the submission of the object 144 for cyberthreat analytics (in the form of the submission 140 including the object 144 and/or its context information 146). The administrative control logic 220 is configured to validate the data sample submission 140, authenticate the subscriber $120_N$ submitting the submission 140, verify that the content of the submission 140 is in compliance with parameters associated with the subscriber's subscription, and thereafter, provide at least a portion of the submission 140 (e.g., object 144, context information 146) to the object evaluation logic 270 for analysis.

The second API 214 provides an interface for submissions directed to subscription management such as ascertain SaaS-based metrics associated with a current state of a subscription. These SaaS metrics may include object submission quota (e.g., number of objects submitted during the subscription period, number of objects available for submission during the remainder of the subscription period, etc.). The third API 216 provides an interface for submissions to parameters and other information to a configuration management module 250 within the administrative control logic 220 to enable subscriber $120_N$, via the device interface 210, to specify parameters that control operability of the cyberthreat analytics.

Alternative, the cybersecurity portal 205 features logic, namely the first logic 206, second logic 207 and third logic 208 of the cybersecurity portal 205, that correspond in operation to the first API 212, the second API 214 and the third API 216, respectively. These logic units support the handling of the submissions through the cybersecurity portal 205 in a manner similar to the APIs of the device interface 210, as described above.

Referring still to FIG. 2, an embodiment of modules deployed within the administrative control logic 220 is shown. Herein, the administrative control logic 220 includes a plurality of modules that collectively operate to receive and validate the submission 140, authenticate the subscriber $120_N$ operating as the source of the submission 140, and verify that the subscriber $120_N$ is authorized to conduct the task associated with the submission 140. The verification may involve the key management module 235 confirming that the subscriber's subscription permits the handling of the task and the SaaS metrics associated with the current state of the subscriber's subscription do not preclude the handling of the task and/or metrics of the current state of submission (e.g., submission threshold reached, etc.). The above-identified modules of the administrative control logic 220 may include, but are not limited or restricted to the subscription management module 225, a subscriber accounts data store 230, the key management module 235, a consumption quota monitoring module 245, a configuration management module 250, and a subscription billing module 265.

The subscription management module 225 is configured to control access, via the cybersecurity portal 205, to the cybersecurity system 100 by controlling the subscription onboarding process. During the onboarding process to register with and gain access to the cybersecurity system 100, the subscription management module 225 gathers subscriber information (e.g., name of company, business address, industry by sector, geographic location, representative contact information, etc.) and financial information associated with the subscriber (e.g., bank account information, credit card information, etc.). The subscription management module 225 further prompts the subscriber, for example subscriber $120_N$, for selection of a particular subscription tier. Each subscription tier may provide different types and/or levels of entitlements (e.g., access privileges, subscription parameters such as submission thresholds, virtual key allocation threshold operating as a constraint to the number of active virtual keys outstanding for a subscriber, etc.), where the usage or allocation of such entitlements may be monitored.

For instance, as an illustrative example, the subscription tiers may be based on different submission thresholds for a prescribed period of time (e.g., a first subscription tier with one million submissions per year (up to 1M/year) at cost \$X and a second "pay-as-you-go" subscription tier with unlimited submissions but higher submission costs per sample, \$X+\$Y where X,Y>0). Additionally, or in the alternative, the subscription tiers may be based on the numbers of active keys outstanding to the subscriber $120_N$ (e.g., prescribed number of active virtual keys allocated to the subscriber $120_N$ for subscriber/device authentication), or the like.

Additionally, the subscription management module 225 may assign the subscription identifier (hereinafter, "Subscription ID" 227) to the subscriber 120$_N$. Herein, the Subscription ID 227 may be relied upon to assist in accessing account data associated with a particular subscription selected by the subscriber 120$_N$, which is maintained within the subscriber accounts data store 230.

The subscriber accounts data store 230 constitutes a data store that is configured to maintain a record of account data associated with each subscriber 120$_1$-120$_N$ registered to access cybersecurity services provided by the cybersecurity system 100. According to one embodiment of the disclosure, the subscriber accounts data store 230 may be configured as (i) one or more virtual data stores (e.g., Amazon® S3 data stores) each maintaining a record of the account data for a particular subscriber and utilized in the aggregate by the IaaS subscriber (cybersecurity vendor), (ii) one or more virtual data stores maintaining a collection of references (e.g., links, etc.), each directed to a different portion of cloud-based storage including account data maintained by public cloud infrastructure resources such as cloud (Amazon®) database resources 156 of FIG. 1B, which is maintained in the aggregate for the IaaS subscriber (cybersecurity vendor), but allocated separately by the cybersecurity system 100 to different SaaS subscribers (e.g., subscribers 120$_1$-120$_N$), or (iii) a hybrid deployment where the storage of credentials and/or personal identifiable information may be included in the virtual data store(s) along with references to the remainder of the account data maintained by the cloud database resources 156.

The "account data" may include any information or meta-information (e.g., Subscription ID 227, keys 240/242, and metrics 232) that may be used to identify or authenticate its subscriber, provide subscription status or expiration date, and/or verify that a task associated with a submission may be handled by confirming compliance with entitlements provided by the subscriber-selected subscription tier. According to one embodiment of the disclosure, each subscriber account may be located using the Subscription ID 227 and/or credentials 242 (e.g., content or a derivation thereof used to locate a location in a virtual data store for account data associated with that subscriber) and is configured to include information associated with the subscriber and subscription entitlements (e.g., which APIs accessible by that subscriber; maximum number of submissions during a select time period, maximum number of issued virtual keys, etc.).

According to one embodiment of the disclosure, the subscriber accounts data store 230 may be configured to monitor and maintain, on a per subscriber basis, metrics including SaaS metrics 232 (representing at least some of the subscription entitlements). The SaaS metrics 232 may include information that represents and maintains a sum total of submissions made by the (SaaS) subscriber 120$_N$ during a particular period of time (e.g., subscription time period). Hence, the SaaS metrics 232 may be accessed to confirm whether the sum total of submissions falls below the maximum number of submissions to ensure compliance with the subscription entitlements, especially before an incoming submission is provided to the object evaluation logic 270. The SaaS metrics 232 may further include information that represents and maintains a sum total of virtual keys currently issued to the SaaS subscriber 120$_N$. The SaaS metrics 232 may be used for billing of the subscriber 120$_N$ based on the number of submissions made during the particular period of time, and in some cases, to ensure compliance with subscription entitlements as the number of active keys outstanding may vary between subscription tiers.

Besides subscriber-specific metrics, the SaaS metrics 232 may include aggregation metrics directed to all SaaS subscribers in efforts to reconcile the costs incurred by the cybersecurity vendor based on public cloud infrastructure resource costs (e.g., costs of cloud processing resources 152 and cloud storage resources 154) against the revenue generated on per submission fee (or a fee per processed object to account for one or more "child" objects that are uncovered during cyberthreat analytics of a "parent" object and may require additional analytics to render a threat verdict of the "parent" object as to its maliciousness). For example, the SaaS metrics 232 may include an aggregate as to the number of submissions for all SaaS subscribers. This metric may be used to determine the profitability of the cybersecurity system 100 to determine whether the cost structure necessitates a change in submission pricing.

As further shown in FIG. 2, the key management module 235 features a key generation module 236 configured to handle credential generation and a key authentication module 237 configured to handle subscriber authentication. Herein, the key generation module 236 may be accessed by a subscriber (e.g. subscriber 120$_N$) via the interface logic 200 using a key generation request message or may be accessed by the subscription management module 225 upon the subscription on-boarding process successfully completing. For both activities, the key generation module 236 may generate "virtual" keys that are relied upon to support communications within the SaaS (cybersecurity system) 100. The key authentication module 237 is provided to handle subscriber identification, which may be required for submission including objects for cyberthreat analytics or even a key generation request message in which a (virtual) key assigned the subscriber 120$_N$ can be included as part of the message.

Referring now to FIG. 3A, a block diagram of an exemplary embodiment of the operability of the key generation module 236 being part of the key management module 235 deployed within the administrative control logic of FIG. 2 is shown. Upon notification by the subscription management module 225 that the subscription process for the subscriber 120$_N$ has successfully completed (see operation A), the key generation module 236 generates a first (primary) key 240 (referred to as a "master key") assigned to the subscriber 120$_N$ associated with the subscription. According to one embodiment of the invention, the master key 240 may be provided to and stored within the subscriber account data 300 for the subscriber 120$_N$, namely stored within a portion of the subscriber accounts data store 230 allocated to or otherwise mapped to the subscriber 120$_N$ (see operation B). The master key 240 is not provided to the subscriber 120$_N$. Instead, the master key 240 may operate as a basis (e.g., seed keying material) used by the credential generation module 236 to generate one or more secondary key 242$_1$-242$_L$ (L≥1) (referred to as "virtual keys").

Herein, a virtual key (e.g., virtual key 242$_1$) may be included as part of a submission (e.g., object, quota, parameter adjustment from the subscriber 120$_N$) and used by the key management module 235 in authenticating the subscriber 120$_N$ and confirming that the subscriber 120$_N$ is authorized to perform a task associated with the submission accompanied by the virtual key 242$_1$. Additionally, each of the virtual keys 242$_1$-242$_L$ allows for tracking of usage of the cybersecurity system 100 by different subscriber members (e.g., individuals, groups, departments, subsidiaries, etc.) that are assigned one of the virtual keys 242$_1$-242$_L$. Also, the virtual keys $242_1$-$242_L$ collectively provide a security administrator of the subscriber with administrative control over access to the cybersecurity system 100, given that the virtual keys $242_1$-$242_L$ may be disabled, assigned prescribed periods of activity, or the like.

In particular, after the subscription registration process has completed, the key management module 235 may receive a key generation request message 310 from a subscriber via the cybersecurity portal (see operation C). Upon receipt of the key generation request message 310, the key management module 235 confirms that the generation and release of the requested number of virtual keys is in compliance with the subscription entitlements such as a maximum number of issued (active) virtual keys outstanding for the subscriber $120_N$ (operation D). If the generation of the virtual keys "VKs" (e.g., VK2 $242_2$, VK3 $242_3$, and VK4 $242_4$) is in compliance with the subscription entitlements 320, the key generation module 236 generates and returns requested virtual keys $242_2$-$242_4$ to the subscriber $120_N$ (operation E). Additionally, as shown in FIGS. 2-3A, the key management module 235 stores the generated virtual keys $242_2$-$242_4$ within the subscriber accounts data store 230 as part of the account data 300 for the subscriber $120_N$.

Referring to FIG. 3B, a block diagram of an exemplary embodiment of the operability of the key authentication module 237 being part of the key management module 235 deployed within the administrative control logic 220 of FIG. 2 is shown. The key authentication module 237 is configured to authenticate the subscriber $120_N$ upon issuance (submitting) of the submission 140 (e.g., submission, quota submission, parameter adjustment submission) and confirm that the task associated with the submission 140 is in compliance with the subscription entitlements afforded to the subscriber $120_N$. More specifically, the submission 140 (inclusive of one of the virtual keys $242_1$ along with the object 144 selected for analysis, its corresponding context information 146 and optionally the Subscription ID 227) is submitted to the cybersecurity system 100 via the interface logic 200 (see operations A&B), represented by the interface logic 200 (e.g., first API 212) as shown. The submission 140 is provided to the key authentication module 237 (see operation C). Thereafter, the key authentication module 237 is configured to conduct multiple levels of authentication on the submission 140 and its contents.

More specifically, the key authentication module 237 (or logic associated with the first API 212 itself) may be configured to conduct a first level of authentication in which the format of the submission 140 is determined as to whether it is compliant with format specifications (see operation D). This may involve logic associated with the first API 212 (or logic within the cybersecurity portal 205) translating information from the submission 140 and the presence (or absence) of certain content (e.g., virtual key $242_1$, object as part of payload, subscriber ID 227, etc.) may be flagged as a valid or invalid submission.

If a valid submission, optionally, the key authentication module 237 may return a code identifying a successful determination to the cybersecurity portal logic 206 (or first API 212). Otherwise, the key authentication module 237 may return an error code to the cybersecurity portal logic 206 (or first API 212), which notifies the subscriber $120_N$ of the error (see operation E). In the event that the submission 140 has a proper format, the key authentication module 237 extracts content (e.g., Subscription ID 227) from the submission 140 to access account data associated with the subscriber $120_N$ within the subscription accounts data store 230. Such access is conducted to retrieve stored, active virtual keys $242_1$-$242_L$ maintained as part of the account data 300 (see operation F).

Herein, the key authentication module 237 may conduct a comparison between the retrieved virtual keys $242_1$-$242_L$ and the virtual key $242_1$ included as part of the submission. Upon determining a successful comparison that represents the virtual key $242_1$ is active, the subscriber $120_N$ is authenticated (see operation G). Additionally, although not shown, the key management module 235 may conduct an analysis of certain context information 146 provided with the submission 140 to confirm, based on the subscription entitlements 320 and/or the metrics 232, whether the submission 140 may be submitted to the object evaluation logic 270.

In this case, provided that the subscriber $120_N$ has been authenticated and authority to perform the task associated with the submission 140 has been verified, the key management module 235 returns a message (see operation H), which prompts the interface logic 200 (e.g., the first API 212) to at least route a portion of the submission 140 (with any additional context gathered during the key management analyses such as entitlement context 148, etc.) to the object evaluation logic 270 (see operation I). Otherwise, the key management module 235 returns an error code, which prompts the interface logic 200 (e.g., the first API 212) to notify the subscriber $120_N$ of a submission error consistent with the error code (see operation J).

Referring now to FIG. 4A, a block diagram of an exemplary embodiment of a first display screen window 400 of a series of display screen windows for altering settings associated the cloud-based cybersecurity system is shown. Herein the display screen window 400 features a number of categories 410, including a settings category 412 for setting policies and/or IP restrictions associated with a virtual key.

As shown in FIG. 4B, after selection of the settings category 412 by an administrator, a second display screen window 420 is rendered. The second display screen window 420 features a link 422 for setting IP address restrictions on a virtual key. Upon selection of the link 422, as shown in FIG. 4C, a third display screen window 430 is generated by a key configuration module (not shown) deployed with the key management module 235 of FIG. 2 and rendered. The third display screen window 430 is provided to allow for the addition (selection of the "Add New IP Restriction" display element 432) and/or removal (selection of the "Remove" display element 434) of address restrictions to virtual keys generated and available to a subscriber. Herein, a single virtual key (VK3) 436 is illustrated with a restricted IP address range 438 represented as IP address range <199.4.2.0>.

Figure 4D:
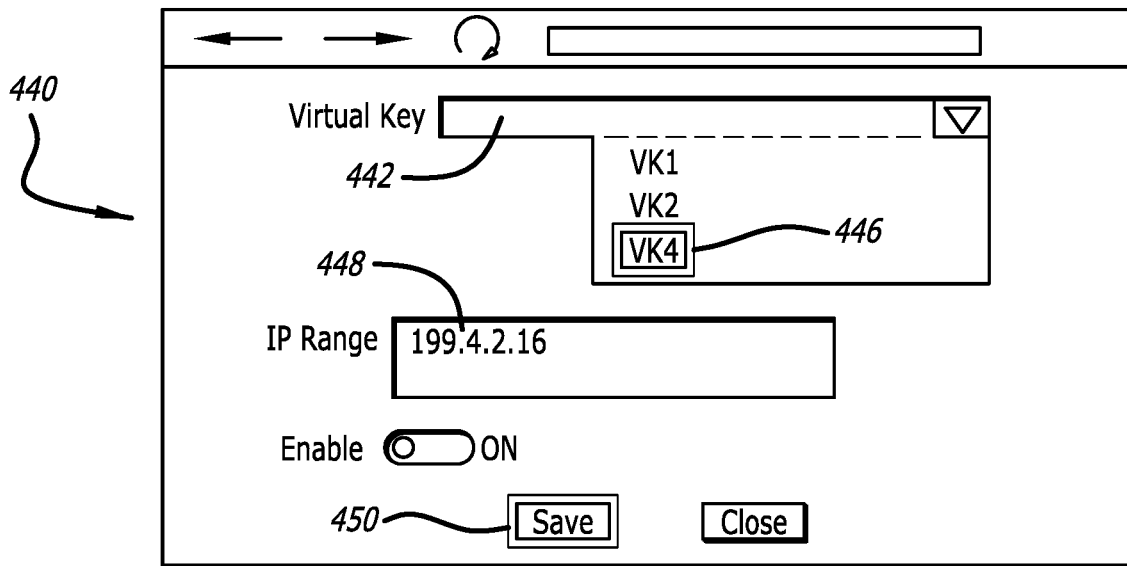
FIG. 4D is a block diagram of an exemplary embodiment of a pop-up window for adding an address restriction to a selected virtual key.

Referring now to FIG. 4D, a block diagram of an exemplary embodiment of a pop-up window 440 for adding an address restriction to a selected virtual key. The pop-up window 440 includes a first field 442 and a second field 444. The first field 442 may be configured as a pull-down menu, as shown, to allow an administrator to select a virtual key (referred to as "VK4") 446 on which address restrictions will be imposed within the second field 444. In particular, a specific address or address range 448 may be selected and entered (e.g., 199.4.2.16) to restrict usage of the virtual key (VK4) to only network devices associated with the selected address or address range. The address or address range may include, but is not limited or restricted to a public IP address or a range of public IP addresses as shown.

Figure 4E:
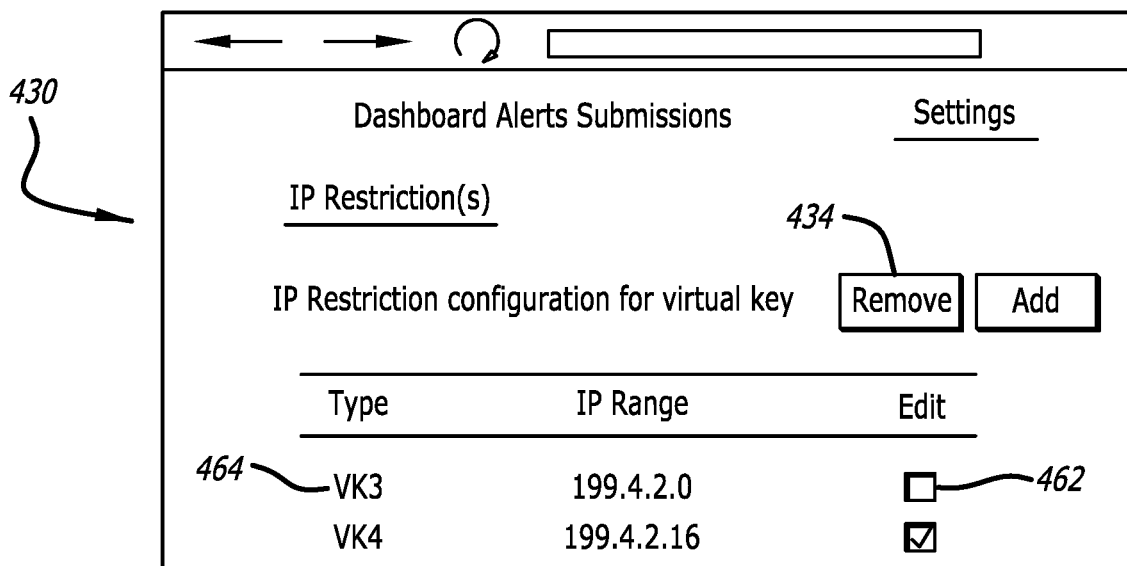
FIG. 4E is a block diagram of an exemplary embodiment of a four display screen window of the series of display screen windows illustrating the addition of the address-restricted virtual key.

Upon selection of a Save display element 450 within the pop-up window 440, as shown in FIG. 4E, the restricted virtual key (VK4) is displayed on a fourth display screen window 460 to provide the administrator with a listing of all of the restricted virtual keys. The administrator may remove the restrictions by going back to the third display screen window 430 and selecting the "Remove" display element 434 or disable the restriction by deselection of the edit box 462 located at the end of an entry associated with virtual key upon which IP restrictions are to be displayed (e.g., entry 464).

Referring back to FIG. 2, consumption quota monitoring module 245 may be accessed through the second API 214 (or via cybersecurity portal logic 207) and is configured to enable a subscriber (e.g., the subscriber $120_N$) to obtain metrics associated with the current state of the subscription (e.g., active status, number of submissions for a particular submission type (or in total) conducted during the subscription period, number of submissions remaining for the subscription period, a number of keys assigned to the subscriber that are still accurate, etc.). The consumption quota monitoring module 245 may be communicatively coupled to the object evaluation logic 270 to receive data associated with the number of objects processed (including "parent" objects being part of the submission 140 and any "child" objects uncovered (or generated) during the processing of another object (e.g., parent or another child object), as described above.

For instance, as an illustrative example, the consumption quota monitoring module 245 may receive a message (quota request submission) from any of the subscribers $120_1$-$120_N$ (e.g., subscriber $120_N$) via the interface logic 200, such as the second API 214 of the device interface 210 (or second logic 207 of the cybersecurity portal 205 for example). Upon receipt of the quota request submission (after virtual key $242_N$ included as part of the quota request submission has been extracted by the credential management module 235 to authenticate the subscriber $120_N$ and the subscriber $120_N$ is authorized to perform this task based on the subscription entitlements), the consumption quota monitoring module 245 may be configured to establish communications with the subscriber accounts data store 230. Upon establishing communications, the consumption quota monitoring module 245 may access various metrics associated with the SaaS metrics 232, such as the subscription status (active/inactive) and/or the sum total of submissions (or submission in particular) made during a selected time period.

Optionally, depending on the logical configuration of the administrative control logic 220, the consumption quota monitoring module 245 may be accessed by the key management module 235 to confirm that a requested task is in compliance with the subscription entitlements. For example, responsive to a submission being a task of conducting analytics on a submitted data sample, the credential management module 235 may be configured to access the consumption quota monitoring module 245 to confirm compliance with the subscription entitlements (e.g., maximum number of submissions constituting the submission threshold has not been exceeded) before task is initiated (e.g., data sample 142 is provided to the object evaluation logic 270 for cyberthreat analytics).

The configuration management module 250 is configured to enable a subscriber, via the third API 216 (or cybersecurity portal 205), to specify parameters that control operability of the cyberthreat analytics. For instance, prior to controlling such operability, the credential management module 235, upon receipt of a parameter adjustment submission, may extract a virtual key included as part of the submission to authenticate the subscriber $120_N$ and verify that the subscriber is authorized to perform this task (cyberthreat analytics configuration). Thereafter, contents of the parameter adjustment submission are routed to the configuration management module 250, which may alter stored parameters that may influence workflow, such as (i) operations of an analytic engine selection module deployed within the object evaluation logic 270 of the cybersecurity system 100 for selection of analytic engines (e.g., priority of analytics, change of analytics based on the subscriber or attack vectors targeting subscriber's industry, etc.), (ii) operations of the analytic engines (e.g., changes in parameters that effect operations of the engines (e.g., available software profile(s), guest image(s), run-time duration, priority in order of cyberthreat analytics, etc.), and/or (iii) operations of the correlation module deployed within the object evaluation logic 270 (e.g., changes to threshold parameters relied upon to issue a threat verdict, etc.) and/or (iv) operations of the post-processing module deployed within the object evaluation logic 270 (e.g., change of retention time periods for context information associated with benign or malicious objects within cybersecurity intelligence, etc.).

The subscription billing module 265 is configured, for a subscription tier with prescribed maximum submissions, to confirm that the subscription parameters have not been exceeded (to denote additional billing) for a time-based, flat-fee subscription (e.g., yearly, monthly, weekly or daily). Alternatively, for a pay-as-you-go subscription, the subscription billing module 265 may be configured to maintain an account of the number of submissions analyzed by the object evaluation logic 270 (e.g., submissions) over a prescribed period of time and generate a request for payment from a SaaS subscriber (e.g., subscriber $120_N$) accordingly. The number of submissions include those submitted from the subscriber $120_N$, and according to some embodiments, may include additional objects uncovered during analytics during the subscription period. Additionally, the subscription billing module 265 may be operable to identify other paid cloud-based services utilized by the SaaS-subscriber $120_N$ for inclusion as part of the payment request. According to one embodiment, the subscription billing module 265 may access the subscriber account data for the requisite information.

Referring still to FIG. 2, the object evaluation logic 270 is configured to receive data samples via the interface logic 200 and conduct cyberthreat analyses on these data sample. The object evaluation logic may be separated into multiple evaluation stages, where each evaluation stage is provided access to a queue that features a plurality of queue elements each storing content (object, context information, etc.) associated with a submitted data sample. For this distributed queue architecture, each "stage" queue is provided access to (or receives) content associated with a data sample evaluated in the preceding evaluation stage. Herein, the object evaluation logic includes a preliminary analytic module (within a first evaluation stage), an analytic engine selection module (within a second evaluation stage), a cyberthreat analytic module (within a third evaluation stage), a correlation module (within a fourth evaluation stage) and a post-processing module (within a fifth evaluation stage). The evaluation stages are described in a contemporaneously filed provisional application entitled "Run-Time Configurable Cybersecurity System," the entire contents are incorporated herewith by reference.

The reporting logic 290 is configured to receive meta-information 292 associated with the analytic results produced by the object evaluation logic 270 and generate a displayable report 294 including the comprehensive results of the cyberthreat analytics (e.g., threat verdict, observed features and any corresponding meta-information representing the results associated with the cyberthreat analytics, context information associated with the observed features that identify the analyses conducted to produce the observed features, circumstances the features occurred, etc.). Accessible by the subscriber $120_N$ via the cybersecurity portal 205, the displayable report 294 may be provided as one or more interactive screens or a series of screens that allow a security administrator (corresponding to a representative of the SaaS-subscriber) to view results of submissions in the aggregate and "drill-down" as to specifics associated with one of the objects uploaded to the cybersecurity system within a submission. The reporting logic 290 may rely on the virtual key $242_N$ or optionally Subscription ID 227 which may be part of the submission 140 submitted to the object evaluation logic 270, to identify the subscriber $120_N$ and determine a preferred method for conveyance of an alert of the presence of the displayable report 294 (and set access controls to preclude access to contents of the displayable report 294 by other SaaS-subscribers). Additionally, or in the alterative, the reporting logic 290 may generate an alert based on the comprehensive results of the cyberthreat analytics. The alert may be in the form of a message (e.g., "threat warning" text or other electronic message).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system for conducting cyberthreat analytics on a submitted object to determine whether the object is malicious, comprising:
   a cloud platform configured to host resources including cloud processing resources and cloud storage resources; and
   a cybersecurity system including:
      a key management module to assign a master key to a subscriber upon registration and generate one or more virtual keys, based at least in part on the master key, for distribution to the subscriber, a virtual key of the one or more virtual keys being included as part of a submission received from the subscriber to authenticate the subscriber and verify that the subscriber is authorized to perform one or more tasks associated with the submission,
      a consumption quota monitoring module configured to monitor a number of submissions received from the subscriber, and
   wherein the cybersecurity system, being configured to operate as a multi-tenant Security-as-a-Service (SaaS) that relies upon the cloud processing resources and the cloud storage resources provided by the cloud platform in performing the cybersecurity operations, is configured to monitor (i) an amount of processing time used by the cloud processing resources and (ii) an amount of storage used by the cloud processing resources.

2. The system of claim 1 wherein the cloud processing resources including one or more computing instances.

3. The system of claim 1, wherein the cybersecurity system further comprises a subscription billing module configured to compute costs associated with usage of the cybersecurity system or confirm compliance with a selected subscription tier based on the received number of submissions from the subscriber.

4. The system of claim 1 being configured to operate as a multi-tenant Security-as-a-Service (SaaS) that relies upon the cloud processing resources and the cloud storage resources provided by the cloud platform in performing the cybersecurity operations.

5. The system of claim 1, wherein the key management module of the cybersecurity system to authenticate the subscriber based on access to a data store maintaining the master key and a plurality of virtual keys assigned to the subscriber.

6. The system of claim 1, wherein the key management module of the cybersecurity system to verify that the subscriber is authorized to perform the one or more tasks associated with the submission by at least accessing subscription entitlements provided to the subscriber based on a subscriber identifier, the subscription entitlements identifying (i) tasks permitted by the subscriber, (ii) tasks precluded by the subscriber, or (iii) both the tasks permitted by the subscriber and the tasks precluded by the subscriber.

7. The system of claim 1, wherein the cybersecurity system is configured to set a usage restriction on each of the one or more virtual keys including the virtual key.

8. The system of claim 7, wherein the usage restriction includes permitting use of the virtual key when provided from a network device residing with a selected Internet Protocol (IP) address range.

9. A computerized method for conducting cyberthreat analytics on a submitted object to determine whether the object is malicious, comprising:
   assigning, by a key management module deployed within a cybersecurity system, a master key to a subscriber;
   generating, by the key management module, one or more virtual keys based at least in part on the master key;
   providing, by the key management module, the one or more virtual keys to the subscriber for distribution, each virtual key of the one or more virtual keys to be included as part of a submission made by the subscriber to a cybersecurity system operating as a cloud-based, multi-tenant Security-as-a-Service (SaaS) to authenticate the subscriber and verify that the subscriber is authorized to perform one or more tasks associated with the submission;
   monitoring, by a consumption quota monitoring module deployed within the cybersecurity system, a number of submissions received from the subscriber; and
   monitoring (i) an amount of processing time used by cloud processing resources hosted by a cloud platform and (ii) an amount of storage within cloud storage resources used by cloud processing resources hosted by the cloud platform.

10. The computerized method of claim 9, wherein the cybersecurity system is configured to access cloud processing resources including one or more computing instances to verify that the subscriber is authorized to perform the one or more tasks.

11. The computerized method of claim 9 further comprising:
   computing costs associated with usage of the cybersecurity system based on the received number of submissions or confirming compliance with a selected subscription tier based on the received number of submissions from the subscriber.

12. The computerized method of claim 9, wherein the key management module of the cybersecurity system to authenticate the subscriber based on access to a data store maintaining the master key and a plurality of virtual keys assigned to the subscriber.

13. The computerized method of claim 9, wherein the authenticating of the subscriber and verifying that the subscriber is authorized to perform the one or more tasks associated with the submission comprises at least accessing subscription entitlements provided to the subscriber based on a subscriber identifier provided with the submission, the subscription entitlements identifying (i) tasks permitted by the subscriber, (ii) tasks precluded by the subscriber, or (iii) both the tasks permitted by the subscriber and the tasks precluded by the subscriber.

14. The computerized method of claim 9 further comprising:
setting a usage restriction on each of the one or more virtual keys including the virtual key.

15. The computerized method of claim 14, wherein the setting of the usage restriction comprises permitting use of the virtual key when provided from a network device residing with a selected Internet Protocol (IP) address range previously set for the virtual key.

16. A non-transitory storage medium deployed as part of a cybersecurity system operating as a cloud-based, multi-tenant Security-as-a-Service (SaaS) including a key management module that, upon execution, performs operations comprising:
assigning, by a key management module deployed within a cybersecurity system, a master key to a subscriber;
generating, by the key management module, one or more virtual keys based at least in part on the master key;
providing, by the key management module, the one or more virtual keys to the subscriber for distribution, each virtual key of the one or more virtual keys to be included as part of a submission made by the subscriber to the cybersecurity system to authenticate the subscriber and verify that the subscriber is authorized to perform one or more tasks associated with the submission;
monitoring, by a consumption quota monitoring module deployed within the cybersecurity system, a number of submissions received from the subscriber; and
monitoring (i) an amount of processing time used by cloud processing resources hosted by a cloud platform and (ii) an amount of storage within cloud storage resources used by cloud processing resources hosted by the cloud platform.

17. The non-transitory storage medium of claim 16, wherein the cybersecurity system further comprising a subscription billing module configured to compute costs associated with usage of the cybersecurity system or confirm compliance with a selected subscription tier based on the received number of submissions from the subscriber.

18. The non-transitory storage medium of claim 16, wherein the key management module of the cybersecurity system to verify that the subscriber is authorized to perform the one or more tasks associated with the submission by at least accessing subscription entitlements provided to the subscriber based on a subscriber identifier, the subscription entitlements identifying (i) tasks permitted by the subscriber, (ii) tasks precluded by the subscriber, or (iii) both the tasks permitted by the subscriber and the tasks precluded by the subscriber.

19. The non-transitory storage medium of claim 16, wherein the cybersecurity system further comprises a key configuration module that, when executed, is configured to set a usage restriction on at least a first virtual key of the one or more virtual keys.

20. The non-transitory storage medium of claim 19, wherein the usage restriction includes permitting use of the first virtual key when provided from a network device residing with a selected Internet Protocol (IP) address range.

* * * * *